L. W. BLANCHARD.
SPRING MOUNTING FOR CYCLE WHEELS.
APPLICATION FILED APR. 18, 1916.
1,230,987.
Patented June 26, 1917.
2 SHEETS—SHEET 1.
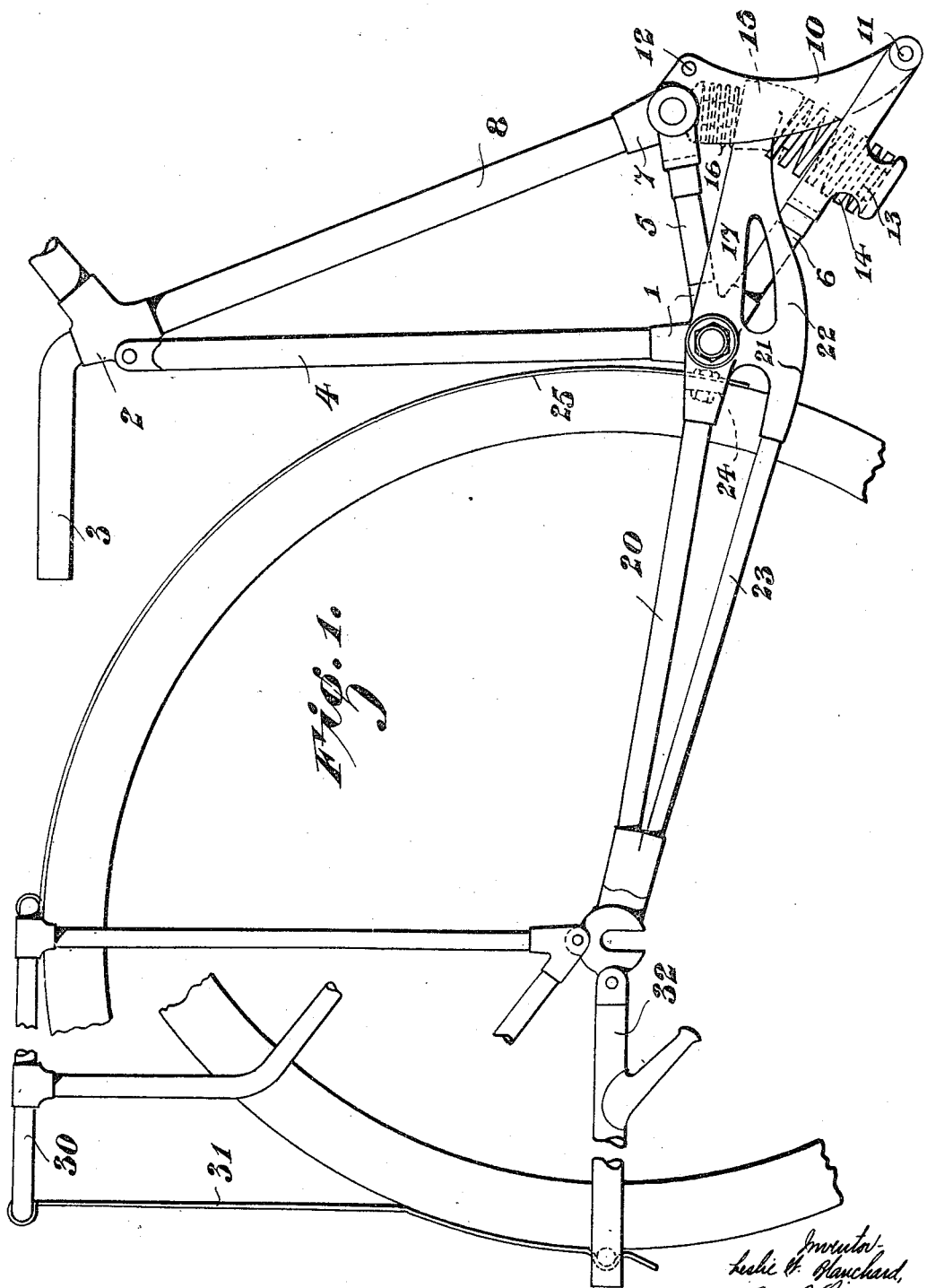

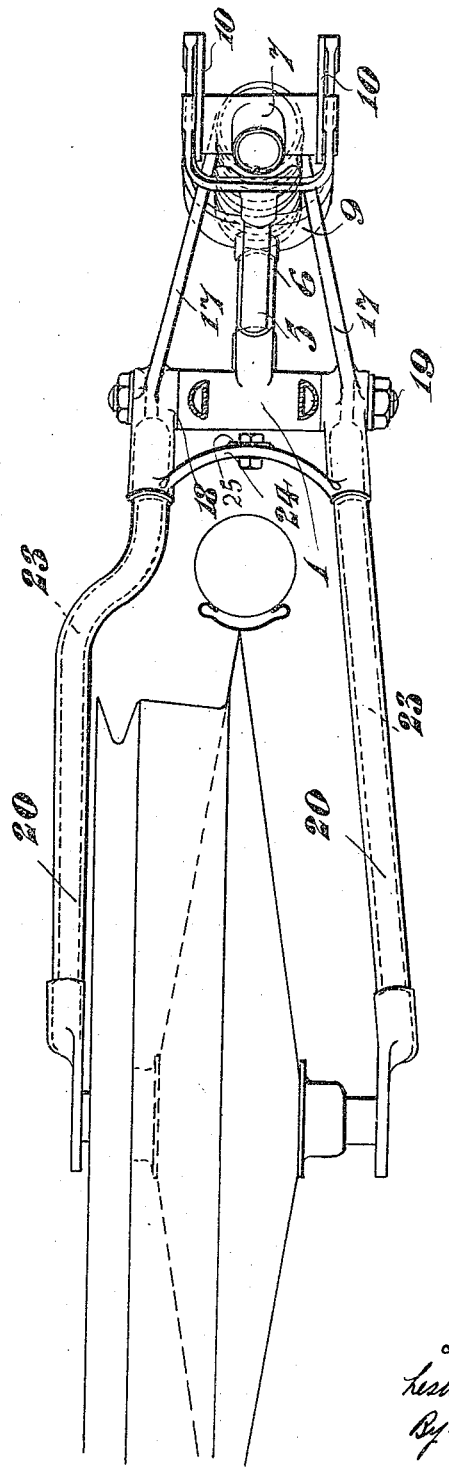

UNITED STATES PATENT OFFICE.

LESLIE WILLIAM BLANCHARD, OF LONDON, ENGLAND.

SPRING-MOUNTING FOR CYCLE-WHEELS.

1,230,987.  Specification of Letters Patent.  Patented June 26, 1917.

Application filed April 18, 1916. Serial No. 92,011.

*To all whom it may concern:*

Be it known that I, LESLIE WILLIAM BLANCHARD, a subject of the Kingdom of Great Britain, residing at 57 Longridge road, Earlscourt, London, S. W., in the county of Middlesex, England, engineer, have invented a certain new or Improved Spring-Mounting for Cycle-Wheels, of which the following is a specification.

This invention relates to anti-vibration mechanism for use in connection with cycles, of the type in which the rear road wheel spindle is carried by two arms disposed one on each side of the wheel, and which arms extend forwardly from the rear wheel spindle to a point at which they are pivotally connected to the rear part of the base of a tripod structure adapted to support the seat.

According to the present invention, in such an arrangement a transverse bracket at which the arms are pivotally mounted extends from one side of the wheel to the other and is incorporated at the rear part of the base of the said seat supporting tripod structure, which latter is incorporated with the rear part of its base disposed in front of the periphery of the rear road wheel.

In order that this invention may be clearly understood and readily carried into practice, reference may be had to the appended explanatory sheets of drawings, upon which:—

Figure 1 is a part side elevation of a cycle illustrating an application thereto of one form of the present invention.

Fig. 2 is a part plan of the structure shown in Fig. 1.

I suitably mount upon the cycle frame at a position in front of the periphery of the rear road wheel, a bracket 1 adapted to carry a spindle. This bracket is connected to the frame lug 2 which carries the saddle pin 3 by two fork-members 4, and it may be further retained in position by two other members 5, 6 which extend forwardly arranged one above the other and diverging. The upper 5 of these forward members may at its fore-extremity be forked and coupled to a lug 7 to which the lower extremity of the saddle pillar 8 of the frame is coupled. The lower 6 of the two diverging members extending forwardly from the bracket 1 is forked at its fore-part as indicated at 9 and the two arms of the fork 9 are at their fore-extremities coupled to the lug 7 at the lower extremity of the seat pillar. This coupling may be effected by plates 10 adapted to accommodate the engine and the coupling bolt at the lower extremities 11 of such plates, and by which the latter are coupled to the fork 9 may pass through the engine crank casing. The upper extremities of the plates 10 may be disposed between the limbs of the forked portion of the member 5 and the lug 7, the parts being clamped together by a transverse bolt. At points near to their upper extremities, perforations 12 are provided in such plates to accommodate another bolt passing through the engine crank casing.

In connection with the lower 6 of the two members which extend forwardly from the bracket 1, a bridge 13, which is conveniently bowed or curved downwardly is provided across the forked portion 9 of this member, such bridge being adapted to accommodate the lower extremity of a coiled spring 14, for which purpose the said bridge is furnished with a central boss adapted to project into the end coils of the spring. The said coiled spring extends upwardly and engages with a lug 15 constituting the fore-extremity of the forward extension of the oscillatory fork by which the road wheel is carried. Above this lug last mentioned a second coiled spring 16, conveniently of less strength is disposed, the upper extremity of such second coiled spring being adapted to take its bearing below the lug 7 at the lower extremity of the seat pillar 8. Bosses are provided above and below the lug 15 at the fore-extremity of the wheel carrying fork, and a boss is also provided at the under-surface of the lug 7 at the lower extremity of the seat pillar 8, these bosses being adapted to retain the springs 14, 16, in their desired working positions. The lug 15 at the fore-extremity of the wheel-carrying fork may conveniently occupy a position between the engine plates 10 aforementioned and said lug is carried by two rearwardly diverging arms 17 which extend to bosses 18 occurring one at each extremity of the spindle bracket 1 provided upon the main frame. A spindle 19 carried in this bracket is adapted to pass through the bosses 18 and may be retained by nuts, one at each end. Two stays 20 extend rearwardly from the bosses 18 last mentioned, and at their rear extremities are adapted to carry the rear road wheel of the bicycle.

It will be noted that the lug 15, constitutes a rigid transverse connection between the stays or members of the wheel-carrying fork, such transverse connection being disposed at a point removed from the point at which the wheel-carrying fork is pivoted, and being adapted, in conjunction with the pivot of the fork, to counteract oscillatory movement of the fork member on one side of the wheel in relation to the fork member on the other side of the wheel. Another transverse member or other transverse members may be incorporated for this purpose, such, for instance, as the transverse member 24 hereinafter referred to. The oscillatory movement of the fork member on one side in relation to the fork member on the other side may, however, be restrained at the axis of oscillatory connection of the wheel-carrying member with the frame, and without necessitating any transverse connection or means in addition to this other than the road wheel spindle. For this purpose the side members of the wheel-carrying fork may, for instance, each be keyed to the spindle 19, which latter may rotate in relation to the bracket 1, so that the side members of the wheel-carrying fork are rigidly combined with the spindle 19 and locked from rotation in relation thereto, such spindle 19 being capable of rotation with the wheel-carrying member in the bracket 1. The bosses 18 being substantially spaced from each other provide a broad transverse bearing for the wheel-carrying fork, effectively imparting lateral stability to the latter. The members 4, 4, 8 together constitute a tripod, the base of which is comprised of the bracket 1, and the lug 7, which are coupled together by the member 5. The tripod not only offers effective support to the bracket 1, restraining it from lateral displacement and preserving its alinement, but also offers a particularly satisfactory and rigid support for the seat.

The wheel-carrying fork is conveniently of duplex or girder form, for which purpose at a position below each of the pivot bosses 18, a short compression member 21 is incorporated, which at its lower extremity adjoins strengthening members 22, 23 extending forwardly and rearwardly, which strengthening members adjoin the main members at positions at or near to their fore- and rear extremities. A triangulated formation is thus provided in front of and to the rear of the pivot 19 on both sides of the structure, the part of the structure in front of the pivot being also triangulated in plan.

The two main members 20 may at a point immediately to the rear of the pivot 19 be connected by a member 24 to which the lower extremity of the mud-guard 25 may be secured, the latter being adapted to extend upwardly and around about one quarter of the wheel, and being then connected at a position above the center of the wheel to the fore-extremity of a carrier 30, which latter is suitably supported from the rear extremity of the oscillatory fork and from the rear extremity of which carrier a further mud-guard 31 may be incorporated extending downwardly to a point level with the wheel spindle. A suitable stand 32 may also be incorporated and pivoted to the rear extremity of the oscillatory fork.

The oscillatory fork may constitute the entire means of connection of the rear wheel to the frame, the two vertical fork-members 4 depending from the upper seat pillar lug 2 downwardly to the bracket 1 carrying the pivot for the oscillatory fork being utilized in lieu of the members which extend obliquely from the upper extremity of the seat pillar to the rear wheel axle.

The rear wheel may be driven by belt or other suitable drive, and may be driven by belt drive from an engine carried by the engine plates 10 previously referred to, without the drive being appreciably interfered with by the movement of the wheel in relation to the frame.

Instead of employing springs above and below the lug 15, only the spring 14 may be employed and disposed below the lug 15, the upper spring being dispensed with. Or the lower spring 14 may be dispensed with, a tension spring being utilized in lieu of the spring 16 and suitably coupled respectively to the lugs 7 and 15.

Other methods of incorporating the spring means may, however, be adopted, and springs other than of the coiled type may, if desired, be employed.

What I claim as my invention, and desire to secure by Letters Patent is:—

A spring mounting for cycle wheels comprising in combination a tripod structure for supporting the seat, a transverse bracket secured in the rear part of the base of said tripod structure, a fork having its members pivotally mounted on said bracket, and a spindle for the rear wheel carried by the rear ends of said members, the rear part of said base being disposed in front of the periphery of the rear wheel.

In witness whereof I have hereunto set my hand in the presence of two witnesses.

LESLIE WILLIAM BLANCHARD.

Witnesses:
A. R. J. RAMSEY,
H. C. WESTON.